(12) United States Patent  
Engelhard et al.

(10) Patent No.: US 6,461,520 B1
(45) Date of Patent: Oct. 8, 2002

(54) USER-ACTIVATED ULTRA-VIOLET WATER TREATMENT UNIT

(75) Inventors: Rolf Engelhard; Stephen P. Kasten, both of Prescott, AZ (US)

(73) Assignee: Life Spring Limited Partnership, Las Vegas, NV (US)

( * ) Notice: Subject to any disclaimer, the term of this patent is extended or adjusted under 35 U.S.C. 154(b) by 0 days.

(21) Appl. No.: 09/575,350

(22) Filed: May 19, 2000

Related U.S. Application Data
(60) Provisional application No. 60/135,295, filed on May 21, 1999.

(51) Int. Cl.[7] .................................................. C02F 1/32
(52) U.S. Cl. .................... 210/748; 210/138; 210/192; 210/764; 250/436; 422/24; 315/360; 315/DIG. 5
(58) Field of Search ........................ 210/748, 764, 210/739, 138, 192; 250/432 R, 435, 437; 422/24, 186.3; 315/360, DIG. 5, 291, 362, 119

(56) References Cited

U.S. PATENT DOCUMENTS

| | | |
|---|---|---|
| 2,970,821 A | 2/1961 | Axt |
| 3,336,099 A | 8/1967 | Czulak et al. |
| 3,550,782 A | 12/1970 | Veloz |
| 3,696,932 A | 10/1972 | Rosenberg |
| 3,726,404 A | 4/1973 | Troglione |
| 4,069,153 A | 1/1978 | Gunther |
| 4,141,830 A | 2/1979 | Last |
| 4,176,061 A | 11/1979 | Stopka |
| 4,179,616 A | 12/1979 | Coviello et al. |
| 4,273,660 A | 6/1981 | Beitzel |
| 4,274,970 A | 6/1981 | Beitzel |
| 4,323,810 A | 4/1982 | Horstmann |
| 4,422,450 A | 12/1983 | Rusteberg |
| 4,437,999 A | 3/1984 | Mayne |

(List continued on next page.)

FOREIGN PATENT DOCUMENTS

| | | |
|---|---|---|
| DE | 3828026 A1 | 2/1990 |
| EP | 0 227 266 | 7/1987 |
| EP | 0 235 315 | 9/1987 |
| EP | 0 237 793 | 9/1987 |
| EP | 0 316 687 | 5/1989 |
| EP | 0 317 687 | 5/1989 |
| JP | 61025685 A * | 2/1986 |
| SU | 1740323 A1 * | 6/1992 |

OTHER PUBLICATIONS

Article entitled, "Fountainhead Technologies Talks About Their Unique Approach tgo Catalytic Water Purification", The Catalyst Review, Nov. 1994, pp. 1,7–9.

Primary Examiner—Joseph W. Drodge
Assistant Examiner—Terry K. Cecil
(74) Attorney, Agent, or Firm—Cahill, Sutton & Thomas P.L.C.

(57) ABSTRACT

A time delay in de-energizing the electronic ballast and its associated UV lamp subsequent to cessation of water discharge from a user-activated water treatment unit ensures irradiation of the water prior to a subsequent user-activated water discharge and reduces the likelihood of any live microorganisms being present in the water subsequently discharged. A soft start of the UV lamp upon actuation of the water treatment unit reduces the mechanical stresses imposed upon the filaments of the UV lamp and the life span of the UV lamp is enhanced.

4 Claims, 3 Drawing Sheets

U.S. PATENT DOCUMENTS

| | | | |
|---|---|---|---|
| 4,676,896 A | * | 6/1987 | Norton |
| 4,694,179 A | | 9/1987 | Lew et al. |
| 4,752,401 A | | 6/1988 | Bodenstein |
| 4,857,204 A | | 8/1989 | Jokik |
| 4,859,914 A | * | 8/1989 | Summa |
| 4,892,712 A | | 1/1990 | Robertson et al. |
| 4,913,827 A | | 4/1990 | Nebel |
| 4,968,437 A | | 11/1990 | Noll et al. |
| 5,082,558 A | | 1/1992 | Burris |
| 5,106,495 A | | 4/1992 | Hughes |
| 5,106,501 A | | 4/1992 | Yang et al. |
| 5,120,450 A | | 6/1992 | Stanley, Jr. |
| 5,141,636 A | | 8/1992 | Flanagan et al. |
| 5,158,454 A | | 10/1992 | Viebahn et al. |
| 5,173,643 A | * | 12/1992 | Sullivan et al. |
| 5,178,755 A | | 1/1993 | LaCrosse |
| 5,178,758 A | | 1/1993 | Hwang |
| 5,180,499 A | | 1/1993 | Hinson et al. |
| 5,207,993 A | | 5/1993 | Burris |
| 5,213,773 A | | 5/1993 | Burris |
| 5,230,792 A | * | 7/1993 | Sauska et al. |
| 5,266,215 A | | 11/1993 | Engelhard |
| 5,268,104 A | | 12/1993 | Masoomain |
| 5,288,412 A | * | 2/1994 | Voorhees et al. |
| 5,302,298 A | | 4/1994 | Leitzke |
| 5,324,423 A | * | 6/1994 | Markham |
| 5,352,369 A | | 10/1994 | Heinig, Jr. |
| 5,431,861 A | | 7/1995 | Nagahiro et al. |
| 5,520,893 A | | 5/1996 | Kasting, Jr. et al. |
| 5,540,848 A | | 7/1996 | Engelhard et al. |
| 5,547,590 A | | 8/1996 | Szabo |
| 5,709,799 A | | 1/1998 | Engelhard |
| 5,935,431 A | | 8/1999 | Korin |
| 5,942,125 A | | 8/1999 | Engelhard et al. |

* cited by examiner

USER-ACTIVATED ULTRA-VIOLET WATER TREATMENT UNIT

CROSS REFERENCE TO RELATED PATENTS

The present invention claims priority to the subject matter disclosed in a provisional application entitled "TIME DELAY ELECTRONIC BALLAST" filed May 21, 1999 and assigned Serial No. 60/135,295 directed to an invention made by the present inventors.

The present application describes apparatus related to and usable with the inventions described in U.S. Pat. No. 5,266,215 issued Nov. 30, 1993 and U.S. Pat. No. 5,540,848 issued Jul. 30, 1996, and U.S. Pat. No. 5,709,799 issued Jan. 20, 1998 which patents are assigned to the present Assignee and incorporated herein by reference.

BACKGROUND OF THE INVENTION

1. Field of the Invention

The present invention relates to user-activated water treatment units and, more particularly to an ultraviolet water treatment unit having a soft start and/or a time delayed shut-off.

2. Description of Related Art

Many UV water treatment systems for use in homes and offices have become available. Generally, these systems are not user-activated. That is, UV radiation in the water UV treatment unit is ongoing whether or not water is being withdrawn. The source of the water may be from a fixed volume container or from a conventional municipal water system. Some of these units have a simple mechanical filter and some may incorporate an activated charcoal filter. The more effective water treatment units incorporate an ultraviolet source to irradiate the water flowing therepast. Other units may include an ozone generator to inject ozone into the water as part of the treatment process.

Yet further sophisticated and effective water treatment units incorporate both an ultraviolet source for irradiating the water flowing therepast and also mechanical filters for removing particulate matter, whether inert or viable. U.S. Pat. Nos. 5,266,215 and 5,540,848 disclose water treatment units that irradiate inflowing water with ultraviolet radiation, transport the irradiated water through a filter and further irradiate the filtered water prior to discharge from the water unit. These two patents are assigned to the present assignee and are incorporated herein by reference.

The introduction of ozone may be incorporated to take advantage of its capability to kill microorganisms and to oxidize matter. An example of such a water treatment unit is provided in U.S. Pat. No. 5,709,799 wherein the water to be treated is ozonated and irradiated with ultraviolet radiation. This patent is owned by the present assignee and is incorporated herein by reference. U.S. Pat. No. 5,540,848 noted above also includes an ozone generator for introducing ozone into the water to be irradiated and filtered.

Traditional ultraviolet water treatment units have a flow through chamber which contains an ultraviolet lamp that is in continuous operation. Several significant detriments exist if an ultraviolet lamp is continuously on even though the water does not flow therepast on a continuing basis. The following is a summary of these detriments. The energy radiated from the ultraviolet lamp tends to heat the surrounding water. Through such heating, the water temperature can rise to a scalding temperature level. If the purpose of the water treatment unit is to provide drinking water for cups and the like, or for other point of use purposes, the heated water is essentially unacceptable. The warm, or even hot water, is conducive to rapid bacterial growth. Thus, the heating effect of the ultraviolet lamp will help to incubate any microorganisms present. Moreover, any bacteria or other microorganisms resident on or in a filter have a protected heated environment within which to grow unchecked. Stagnant water in a container proximate an ultraviolet lamp will tend to stratify. Such stratification may result in water that may not be properly and adequately irradiated with ultraviolet radiation. As the water is heated, its ability to dissolve minerals is increased. Upon an inflow of cold water as a result of use of the water treatment unit, the warm/heated water will suddenly cool. Such cooling may result in release of any dissolved minerals. These released minerals will, over time, coat the ultraviolet lamp, or its protective sheath. Such gradual coating will reduce the amount of radiation transmitted into the water without the user being aware of the resulting reduced efficiency in treating the water. At some point, a health hazard may come into being. The ultraviolet radiation emitted will chemically degrade or alter the transparent envelope surrounding the filament and/or a protective UV transparent sheath. Over time, the envelope and/or sheath will become more and more opaque to ultraviolet radiation. This process is generally referred to as solarization.

The detriments noted above are, by and large, obviated by a use-activated water treatment unit. This is particularly true for water treatment units that are intended for home use or use in an office environment during business hours only. Presently known user-activated water treatment units have two major detriments. The first such detriment is the time necessary for an ultraviolet lamp to achieve full intensity. During this "ramp-up" period, any water flowing therepast will be irradiated by ultraviolet radiation at less than full intensity. Such reduced intensity of radiation may result in an initial flow of water not being fully or completely irradiated and some viable microorganisms, normally killed by the ultraviolet radiation, may be discharged from the water treatment unit. A filament as a source of radiation, whether in the visible light spectrum or ultraviolet light, in a lamp is are subjected to a rapid temperature increase when energized. The rapid temperature increase causes significant mechanical stresses in the filament. These mechanical stresses will, over a period of time, mechanically weaken the filament and failure of the filament will occur. The number of cycles of energizing and de-energizing the filament are a function of and generally dictate the actual life span of the filament.

SUMMARY OF THE INVENTION

A user-activated water treatment unit incorporates an ultraviolet (UV) lamp for irradiating water flowing therepast to kill microorganisms that may be present. Upon energization of the ultraviolet lamp, a soft start circuit gradually increases the current flow through the UV lamp to reduce the rate of heating of the lamp filament and thereby minimize the mechanical stresses incurred by the filament during a ramp up period. To reduce the number of on/off cycles of the ultraviolet lamp a time delay circuit maintains the lamp energized for a set time after an initial water discharge has ceased to permit a close in time subsequent use without turning the lamp off therebetween. Furthermore, the time delay before shut off will irradiate the water remaining after completion of a water discharge to ensure that a subsequent water discharge during the ramp up of the UW lamp period will have been previously filly irradiated to kill microorganisms then present. The soft start circuit and the time delay circuit may be used independently of one another in a water treatment unit.

It is therefore a primary object of the present invention to provide protective measures for enhancing the longevity of an ultraviolet lamp used in a user activated water treatment unit without compromising the killing of any microorganisms present.

Another object of the present invention is to provide a soft start for an ultraviolet lamp used in a user-activated water treatment unit to reduce the stresses imposed upon the lamp filament upon energization.

Still another object of the present invention is to provide a time-delay circuit for extending energization of an ultraviolet lamp in a user activated water treatment unit to reduce the number of cycles of the lamp during a brief interval repeated user activity.

Yet another object of the present invention is to continue to irradiate with ultraviolet radiation water present in a user-activated water treatment unit after water discharge has ceased.

A further object of the present invention is to provide a user activated water treatment unit that will discharge pre-ultraviolet irradiated water upon energization of the unit.

A still further object of the present invention is to provide a method for enhancing the longevity of a filament in an ultraviolet lamp used to irradiate water flowing through a user activated water treatment unit.

A yet further object of the present invention is to provide a method for ensuring that water discharged from a user activated water treatment unit has been pre-irradiated with ultraviolet radiation.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which.

DESCRIPTION OF THE PREFERRED EMBODIMENT

Figure 1:
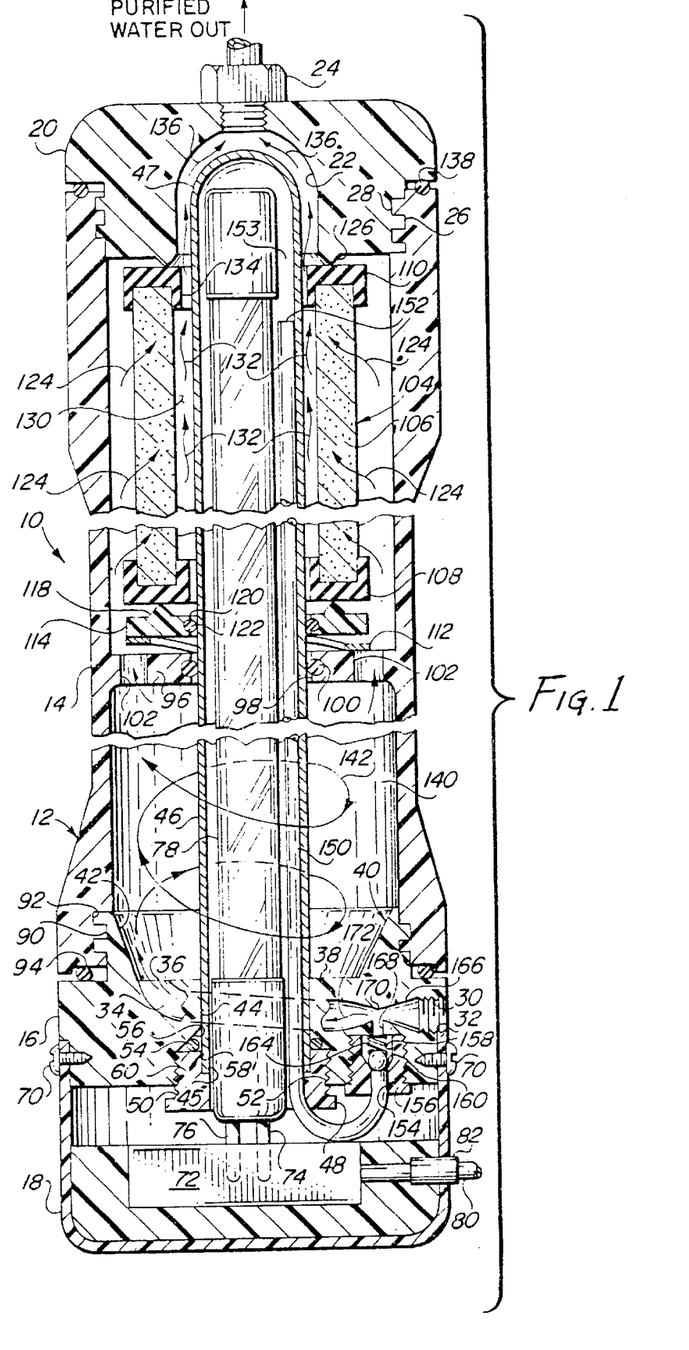
FIG. 1 illustrates a water treatment unit.

Referring to FIG. 1, there is illustrated a water purification apparatus or water treatment unit 10 in the general shape of a canister 12. The canister includes a central sleeve member 14 for conveying water longitudinally therein during purification. The canister is detachably attached to a water inlet member 16. A base 18 attached to the water inlet member supports canister 12. A top member 20 is detachably attached to the upper end of sleeve member 14 for closing the upper end of the sleeve member and for providing an outlet for the water purified within water purification apparatus or water treatment unit 10.

As shown in FIG. 1, water inlet member 16 includes an inlet 30, which inlet may include internal threads 32 for threaded engagement with a nipple or conduit conveying water to the water inlet member. The inlet is in communication with a passageway 34 for conveying the inflowing water to outlet 36, which outlet is disposed in base 38 of depression 40 formed in water inlet member 16. The orientation of outlet 36, in combination with the adjacent section of passageway 34, directs the outflow against cone shaped wall 42 of depression 40 to induce a circular or swirling motion of the inflowing water. A passageway 44 extends through the center of water inlet member 16 for receiving and supporting bottom open end 45 of a tube 46 having a closed top end 47. An apertured collar 48 is in threaded engagement with threads 50 disposed in radially expanded section 52 of passageway 44. An O-ring 54 encircles bottom end 45 of tube 46 adjacent shoulder 56 of passageway 44. Collar 48 may include a radially expanded depression 58 for receiving and supporting bottom end 45 of tube 46. Upon tightening collar 48, tube 46 is moved axially within passageway 44 due to the force exerted upon it by the lower end (shoulder) of depression 58. O-ring 54 will be compressed between shoulder 56 and the adjacent cylindrical surface of tube 46 by end 60 of the collar to form a water tight seal between the cylindrical surface of the tube and passageway 44.

Base 18, being cup shaped, as illustrated, may be secured to water inlet member 16 by fastening means, such as screws 70. A socket 72 is formed within the base to support and electrically engage prongs 74, 76 of ultraviolet (UV) lamp 78. This lamp emits ultraviolet radiation; necessarily, tube 46 must be transmissive to such radiation and it is therefore preferable that the tube be made of quartz or similar material. Socket 72 also includes an electrical circuit necessary to energize ultraviolet (UV) lamp 78. Electrical power for the circuit is provided by conductor 80 extending from base 18 through grommet 82 or the like. Conductor 80 is electrically connected to a source of electrical power (not shown) such as a source of 12 vdc or 120 vac.

Sleeve member 14 includes internal threads 90 for threadedly engaging threads 92 at the upper end of water inlet member 16 and encircling depression 40. Upon threaded engagement between the sleeve member and the water inlet member, O-ring 94 disposed therebetween is compressed to provide a watertight engagement. A radial flange 96 disposed within sleeve member 14 includes a central aperture 98 for accommodating penetrable engagement of tube 46. An O-ring 100 disposed therebetween prevents water flow intermediate tube 46 and aperture 98 of flange 96. A plurality of passageways 102 are disposed in flange 96 to permit water flow therethrough into the upper end of sleeve member 14.

A filter cartridge 104, which may be of any one of many types of commercially available filter cartridges, is penetrably mounted upon tube 46; it may include activated carbon/charcoal to remove chlorine and other similar compounds. Such a cartridge includes a cylindrical filter element 106 having annular support members 108,110 disposed at opposed ends. These support members are generally of rubber, neoprene, or the like. A spring washer, such as wave spring washer 112, rests upon flange 96 and receives support therefrom. A filter support disk 114 rests upon the wave spring washer. This disk includes an annular ridge 116 which, in compressive engagement with annular support member 108, establishes a seal therebetween. Such seal precludes water flowing through passageways 102 of flange 96 from flowing to the interior of the filter cartridge intermediate the filter support disk and annular support member 108. Furthermore, an O-ring 120 is disposed intermediate central aperture 122 of the filter support disk and tube 46. Typically, the spring rate of wave spring washer 112 is linear between twenty percent (20%) to eighty percent (80%) of available deflection and thereby provides essentially constant pressure against cartridge filter 104 to maintain the seal between annular ridge 118 and annular support member 108. Accordingly, all water flowing from passageways 102 flows to the exterior of filter element 106, as depicted by arrows 124, and through the filter element. Top member 20 includes a similar annular ridge 126 for compressively engaging annular support member 110 to prevent water flowing to the interior of the filter cartridge between the top member and the upper end of filter cartridge 104. Thus, all water flowing through passageways 102 must flow through the filter cartridge from the outer surface to the inner surface of the filter element.

Support members 108 and 110 are annular in configuration and may have internal diameters greater than the diameter of tube 46, as depicted. Water flowing through filter element 106, as depicted by arrows 124, flows into the annular space interior of the filter element and adjacent tube 46, which space is identified by numeral 130. The water flow through space 130 is upwardly, as depicted by arrows 132. Outflow from space 130 is through the annular channel defined between inner annular surface 134 of support member 110 and the cylindrical surface of tube 46.

Top member 20 includes a depression 22 for receiving top end 47 of tube 46. The depression is sized sufficiently greater than the top end of the tube to permit flow of water adjacent the tube, as depicted by arrows 136. An outlet fixture 24 is secured to and extends from top member 20 to accommodate outflow of water from depression 22. Top member 20 is detachably attached to the upper end of sleeve member 14 by threads 26 of the top member engaging threads 28 of the sleeve member. A water tight fit is assured by O-ring 138 compressed between the top member and the sleeve member upon threaded engagement therebetween.

In operation, water to be filtered enters through inlet 30 in water inlet member 16 and is discharged through outlet 36. The angle of discharge causes the water to flow in a circular path within compartment 140 in sleeve member 14 in a helical manner, as depicted by helical arrow 142. The circular water flow is enhanced in part by cone shaped wall 42 in the water inlet member. The water swirling about tube 46 in compartment 140 is subjected to UV radiation from UV lamp 78. As is well known, any living microorganisms, whether bacteria, viruses, etc. will be killed upon UV irradiation. Moreover, certain compounds, if present in the water, may be oxidized to enhance purification of the water. The water swirling about tube 46 will enhance exposure of all of the living microorganisms to UV radiation and thereby a more complete killing of the microorganisms is enhanced. The swirling water will also perform a scrubbing action upon tube 46 to help maintain it clean and clear. The swirling water ultimately flows through passageways 102 to the outer surface of filter element 106. Flow of the water through the filter element will cause removal of particulate matter, including dead or living microorganisms. The water discharged from the interior surface of filter element 106 flows adjacent tube 46, as depicted by arrows 132 to again subject the water to UV irradiation. Any living microorganisms entrained in the water flowing from the filter element will be killed through the resulting UV irradiation. Furthermore, the inner surface of the filter element from which the water is discharged will be irradiated by UV to kill any residual microorganisms that may attempt to grow there. The filtered and purified water flows into depression 22 and is discharged through outlet 24 to a point of use.

At greater or lesser intervals, depending upon the degree of contamination of the inflowing water, filter cartridge 104 should be replaced. Such replacement is readily effected by simply unscrewing top member 20 from sleeve member 14 and withdrawing the cartridge filter from about tube 46. A replacement filter is mounted upon the tube and the top member is screwed on to the sleeve member to lock the filter in place and provide a watertight seal between the sleeve member and the top member.

The water purification apparatus or water treatment unit described above purifies water by subjecting the water to ultraviolet radiation and by filtering entrained matter. As depicted in FIG. 1, water treatment unit 10 also provides a further capability of generating ozone and entraining the generated zone in the inflowing water to enhance killing of any microorganisms and to enhance oxidation of certain compounds. It is well known that ultraviolet radiation in air will alter the molecular structure of oxygen ($O_2$) to produce ozone ($O_3$). Since ultraviolet lamp 78 is located in an air environment or air space within tube 46, some of the oxygen molecules in the air space between the lamp and the tube will be converted to ozone molecules. Furthermore, these ozone molecules will collect at closed top end 47 of tube 46. A conduit 150 is disposed within tube 46 adjacent UV lamp 78. Inlet 152 of the conduit is disposed in an air space 153 proximate the top end 47 of tube 46. The lower end of the conduit extends from within tube 46 into passageway 154 of a plug 156. The plug is in threaded engagement with water inlet member 16. A radially expanded section 158 of passageway 154 includes cone shaped annular bottom surface 160. A ball 162, located adjacent surface 160 in response to a coil spring 164, serves in the manner of a check valve to permit flow from conduit 150 into expanded section 158 but not in reverse. Inlet 30 for the water to be purified, is directed through a venturi section 166. A passageway 168 interconnects expanded section 158 with the diametrically restricted section 170 of venturi section 166. As is well known, and in accordance with the Bernoulli principle, the pressure at section 170 will be below ambient pressure. Accordingly, an inflow of ozone, as depicted by arrow 172 will occur. The inflow results in a reduced pressure in expanded section 158 below that present within conduit 150. Because of the difference in pressure on opposed sides of ball 162, the check valve will open. Accordingly, ozone will be drawn from conduit 150 into expanded section 158, through conduit 168 and into section 170. Reverse flow through the check valve is precluded by the sealing engagement of ball 162 with the outlet of conduit 150 under urging of coil spring 164. It may be noted that an O-ring or other sealing member may be incorporated intermediate plug 156 and water inlet member 16 to ensure that water will not leak into base 18.

The water flow from inlet 30 through venturi section 166 will draw a flow of air, and any ozone present, into inlet 152 of conduit 150 for discharge past ball 162 through expanded section 158 and into section 170. The resulting entrainment of air and ozone will be swirled about tube 46 in compartment 140, as depicted by arrow 142. The presence of ozone in the water, will, by itself, result in killing living microorganisms present and oxidation of certain compounds, if present. Thus, any living microorganisms present in the water within sleeve member 14 will be subjected to the killing effect of both UV radiation from lamp 78 and ozone. Filter element 106 of filter cartridge 104 will remove any particulate matter that may be present, including residue of any killed microorganisms. To the extent ozone flows into filter element 106, it will kill any living microorganisms on the surface of the filter into which the water flows. To the extent that any living organisms are entrained in the water outflowing from the interior surface of filter element 106, they are again irradiated with UV radiation from lamp 78 prior to discharge through outlet 24. To the extent any ozone may be present in the water flowing through and from the filter element, killing of the microorganisms will be enhanced.

Water treatment unit 10 is a user-activated unit. This means that water will be discharged from the unit only upon demand by a user by opening a valve, a spigot, or the like in fluid communication with outlet fixture 24. UV lamp 78 requires an electronic ballast to operate. Thus, energization of the UV lamp is function of power received from the electronic ballast. Energization of the electronic ballast may be by use of an electrical switch connecting the electronic ballast with a source of electrical power, which switch may be manually actuated by a user, automatically actuated upon switching the water discharge valve from a closed to an open state, or by a water flow sensing device. Similarly, power to the electronic ballast may be shut off by a manually actuated switch, by change in the state of the discharge valve from the open to the closed position or by a water flow sensing device. As mentioned above, the circuitry for operating the UV lamp may be housed in socket 72 of water treatment unit 10, in whole or in part, or some or all of the circuitry may be located external to the water treatment unit.

Figure 2:
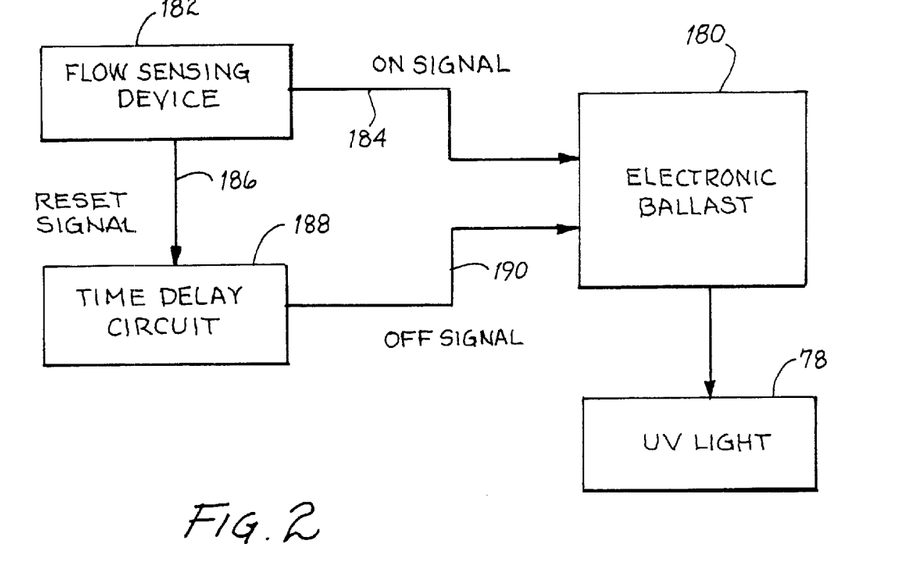
FIG. 2 is a block diagram illustrating circuitry for energizing an ultraviolet lamp, such as that illustrated in FIG. 1.

Referring to FIG. 2, there is illustrated a time delay circuit to permit the flow of electric power to the electronic ballast for a limited period of time subsequent to cessation of discharge of water from water treatment unit 10 (See FIG. 1). Flow sensing device 182 may be any one of many commercially available devices for sensing flow of a fluid. The flow sensing device may be located in conjunction with conduit conveying water into water treatment unit 10 or in conjunction with conduit discharging treated water from outlet fixture 24 of the water treatment unit. Upon flow of water into or out of the water treatment unit, depending upon the location of flow sensing device 182, it generates an "on" signal that is conveyed on conductor 184 to an electronic ballast 180 to activate the electronic ballast. A reset signal is generated and conveyed via conductor 186 to time delay circuit 188. Upon receiving the "on" signal, the electronic ballast will energize UV lamp 78 in a conventional manner. The reset signal conveyed to the time delay circuit will reset the time delay. When flow sensing device 182 senses that flow of water has ceased, the "on" signal will no longer be transmitted via conductor 182 to the electronic ballast. However, as the electronic ballast has been energized, it will remain energized until it receives an "off" signal. Simultaneously, the reset signal will no longer be present. In the absence of the reset signal, the time delay circuit will begin a countdown for a predetermined time period. At the conclusion of such time period, the time delay circuit will generate an "off" signal to be conveyed via conductor 190 to electronic ballast 180. On receipt of the off signal, the electronic ballast will become de-activated and UV lamp 78 will cease to radiate.

However, in the event water treatment unit 10 is caused to discharge water by a user prior to the end of the predetermined time delay period, flow sensing device 182 will sense such resumed water flow and generate a reset signal. Upon receipt by time delay circuit 188 of the reset signal via conductor 186, the previous countdown will be terminated and an "off" signal will not be transmitted on conductor 190 to electronic ballast 180. Thus, UV lamp 78 will continue to radiate. In the event flow through water treatment unit 10 is not resumed within the predetermined time period set by the time delay circuit, the "off" signal will be generated by the time delay circuit and conveyed to the electronic ballast to cause it to become de-activated and the UV lamp will be turned off. The predetermined time period of the time delay is preferably configured so that it allows enough time for treatment of the water present within water treatment unit 10 after flow therethrough has ceased but the predetermined time period should be limited enough to prevent any significant heating of the water and an increase of the water temperature. Although the predetermined time period is specific to a particular water treatment unit, a time period not to exceed three minutes is believed to be adequate.

The use of the time delay circuit has several advantages. It ensures that all water within the water treatment unit has been adequately irradiated prior to the next discharge of water from the unit. A user can activate the UV lamp to irradiate the water present for a specified period of time by causing a momentary discharge of water. This feature permits the user to pretreat the water in the water treatment unit prior to actually discharging water therefrom for an intended use. Thereby, a user will have an added assurance of complete water treatment. During a period of successive water discharges spaced apart by brief time intervals, the UV lamp will remain continuously on instead of cycling on and off with each discharge. This benefits the longevity of the UV lamp since the filament is not subjected to the mechanical stresses associated with rapid heating and cooling during each on/off cycle.

Figure 3:
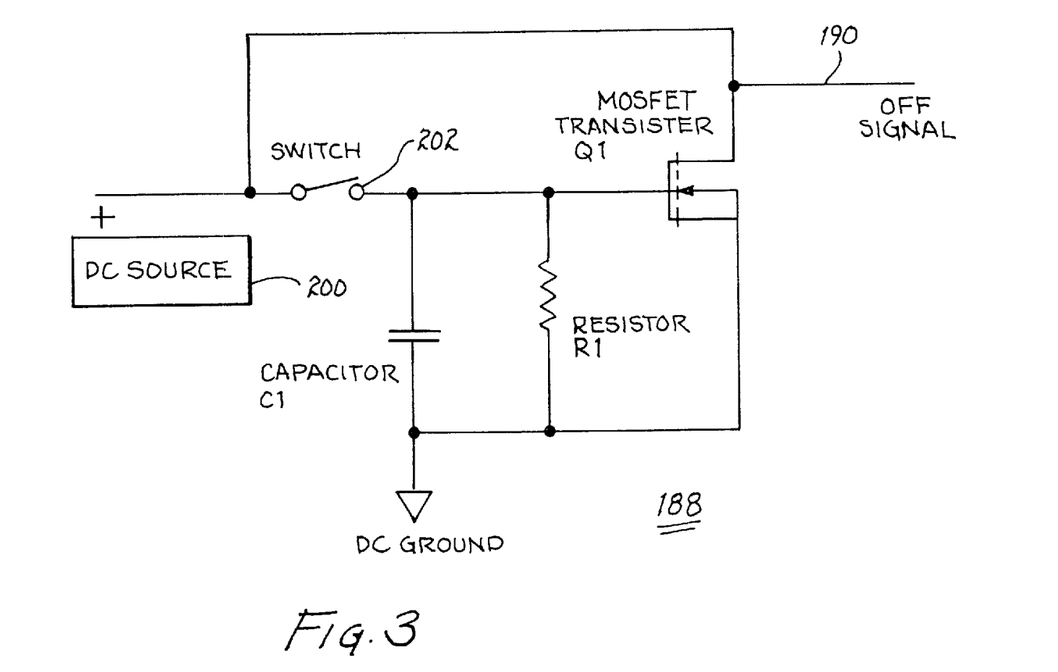
FIG. 3 illustrates a time-delay circuit.

Referring to FIG. 3 there is illustrated a representative time delay circuit 188. Capacitor C1 is charged upon application of a DC control voltage from a DC source 200 upon closing switch 202, which switch is activated by or in response to discharge of water from water treatment unit 10. Simultaneously, a high voltage is applied to the gate of MOSFET transistor Q1 to allow current to flow through the transistor and the voltage on conductor 190 will be low just above ground voltage). When switch 202 is opened as a result of cessation of water discharge from the water treatment unit, capacitor C1 will discharge through resistor R1 to ground. As the capacitor is discharging, the voltage at the gate of transistor Q1 will remain high. The rate of discharge of capacitor C1 and hence the effective time delay, is controlled by the relative values of the capacitor and resistor R1. As the discharge from capacitor C1 becomes reduced, the voltage at the gate of transistor Q1 is reduced and at some point the transistor will switch off and no further current will flow through it. This results in the voltage on conductor 190 going high. The high voltage on conductor 190 is sensed by an electronic ballast 180 as the "off" signal and the electronic ballast will be de-activated or switched off.

As will be evident from the above discussion, several advantages of incorporating a time delay circuit for energizing the ballast become evident. One of the shortcomings of a traditional water treatment unit incorporating a UV lamp is that an initial discharge may be of non-UV irradiated water. By delaying shut-off of the UV lamp, the water present within the water treatment unit subsequent to cessation of water discharge will be irradiated for a period of time to kill any microorganisms which may have been introduced with the inflowing water just prior to cessation of water discharge. The extent of such irradiation is a function of the time period of the delay before the UV lamp is turned off. UV lamps burn out for the same reasons an incandescent lamp burns out; the filament breaks as a result of mechanical stresses imposed by rapid heating and cooling occurring during each cycle. By maintaining the UV lamp on for a limited period of time after water discharge ceases, a water discharge following shortly thereafter will not provoke a further cycle of the UV lamp. Thus, the time delay in de-energizing the ballast will reduce the number of cycles to which the UV lamp is subjected. With the reduced number of cycles, the stresses imposed upon the filament are reduced and the life of the UV lamp is extended. A further subtle advantage of incorporating a time-delay ballast will occur if a small amount of water is first discharged to energize the UV lamp. Thereafter, a discharge of water for consumption purposes will have been irradiated by the full intensity of the UV lamp and the probability of killing any microorganism present in the water to be consumed is enhanced. As alluded to above, the time delay can be extended or shortened by varying the respective values of capacitor C1 and resistor R1.

Figure 4:
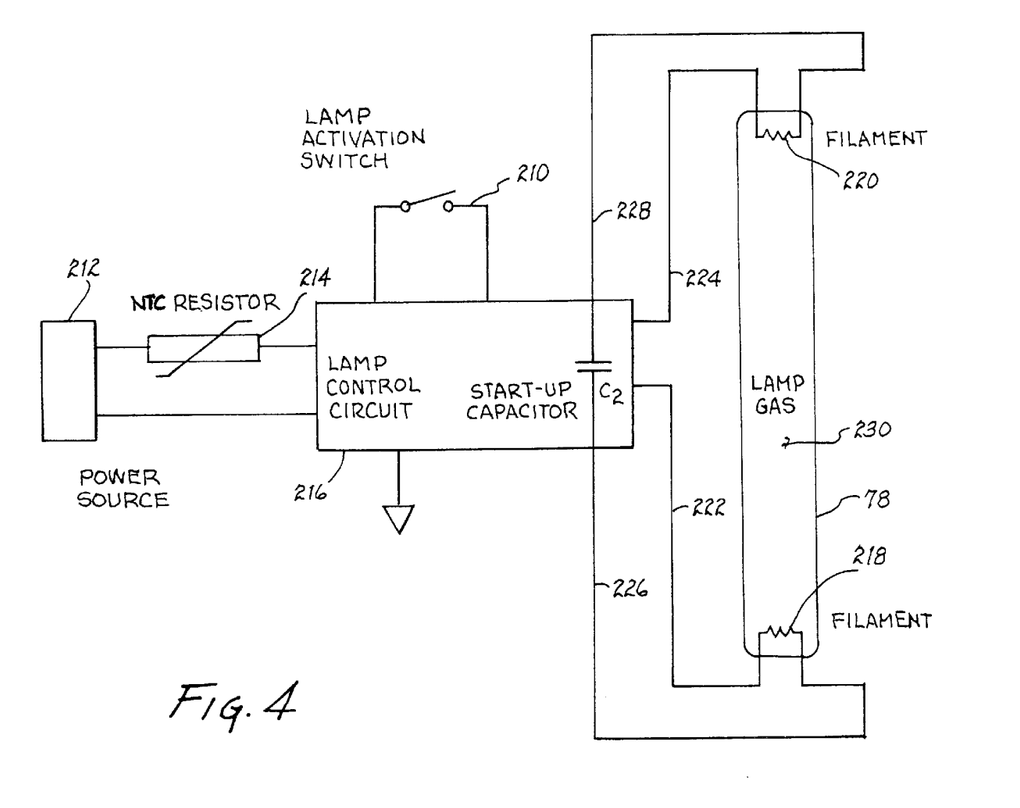
FIG. 4 illustrates a soft start circuit.

FIG. 4 illustrates a soft start circuit for energizing UV lamp 78. Lamp activation switch 210 will close in response to discharge of water from water treatment unit 10 sensed by flow sensing device 182 or by manual actuation. Upon closing of switch 210, power from an electrical power source 212 will be conveyed through negative temperature coefficient resistor 214. The characteristics of this resistor are such that it has a high resistance at ambient temperature, which resistance reduces as the temperature of the resistor increases. As a result, the current flowing to lamp control circuit 216 is initially limited but increases as the resistance of resistor 214 decreases due to a rise in temperature. Negative temperature resistors are commercially available with different ramp rates from a few milliseconds to over a 100 milliseconds. Accordingly, a negative temperature coefficient resistor can be selected to have a ramp rate commensurate with a desired current increase provided to lamp control circuit 216.

The negative temperature coefficient resistor will work with either a cold cathode (two wire) or a hot cathode (four wire) UV lamp. UV lamp 78 is shown as a hot cathode UV lamp in FIG. 4. Power is applied to one end of each of filaments 218, 220 from lamp control circuit 216 via conductors 222, 224, respectively. The other ends of filaments 218, 220 are interconnected through capacitor C2 via conductors 226, 228.

When power is applied, negative temperature coefficient resistor 214 limits the amount of power available to flow through filaments 218, 220. Because the current flowing through the filaments is alternating, capacitor C2 provides little resistance to the current, as a result, the current flowing through the filaments pre-heats the filaments. As the current, and power, flowing through the filaments increases as a result of reduced resistance of the negative temperature coefficient resistor, gas 230 (mercury vapor) in UV lamp 78 ionizes. Upon such ionization, the resistance to current flow through the gas decreases to a value less than that of start up capacitor C2. As a result, current flows between filaments 218, 220 through the ionized gas and UV lamp 78 will have transitioned from a start-up mode to a full intensity mode.

In a two wire (cold cathode UV lamp), conductors 226, 228 and start-up capacitor C2 are absent. Nevertheless, the initial low current flowing through filaments 218, 220 due to operation of the negative temperature coefficient resistor causes the filaments to heat more slowly than if the start-up current were not limited by the negative temperature coefficient resistor.

As discussed above, the main advantage of the soft start for the UV lamp is that of reducing the mechanical stress imposed upon the filaments by heating the filaments more slowly. The reduced level of mechanical stress will extend the life of the filaments and thereby increase the useful life of UV lamp 78. Another advantage of a soft start is that of providing a lower initial power loading of the electronic ballast (see FIG. 2); such lower power loading will induce less electrical and mechanical stress upon the components of the electronic ballast and its life will be extended.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

We claim:

1. A method for energizing a filament of an ultraviolet lamp containing vapor and used for killing microorganisms in a water treatment unit, said method comprising the steps of:

a) generating a signal to energize the filament of the ultraviolet lamp commensurate with discharge of water from the water treatment unit;

b) limiting an initial current applied to the filament to a value insufficient to provide enough power to ionize the vapor in the ultraviolet lamp; and c) increasing the current applied to the filament to bring about ionization of the vapor in the ultraviolet lamp and generation of ultraviolet radiation from the ultraviolet lamp, said step of increasing including the use of a negative temperature coefficient resistor to control the value of the current as an inverse function of the temperature of the resistor.

2. The method as set forth in claim 1 wherein the ultraviolet lamp is a four wire ultraviolet lamp and wherein said step of increasing includes the use of a capacitor to shunt the initial current applied to the filament of the ultraviolet lamp.

3. A user-activated water treatment unit for discharging water on demand by a user, said unit comprising in combination:

a) an ultraviolet lamp for irradiating water with ultraviolet radiation to kill any microorganisms present in the water;

b) a canister containing said ultraviolet lamp and for directing water from an inlet past said ultraviolet lamp for discharge through an outlet on demand;

c) an electronic ballast for energizing said ultraviolet lamp;

d) a time delay circuit for activating said ballast upon discharge of water from said canister and for producing a countdown signal to maintain said ballast activated for a predetermined period of time subsequent to cessation of discharge of water from said canister;

e) said time delay circuit including a reset signal generated upon discharge of water from said canister during the predetermined time period to terminate production of the countdown signal; and f) a soft start circuit for limiting a current initially applied to a filament of said ultraviolet lamp to reduce the rate of temperature increase of said filament including a negative temperature coefficient resistor to limit the current applied to said filament.

4. A user-activated water treatment unit for discharging water on demand by a user, said unit comprising in combination:

a) an ultraviolet lamp for irradiating water with ultraviolet radiation to kill any microorganisms present in the water;

b) a canister containing an ultraviolet lamp and for directing water from an inlet past said ultraviolet lamp for discharge through an outlet on demand;

c) an electronic ballast for energizing said ultraviolet lamp; and d) a soft start circuit for limiting a current from said ballast initially applied to a filament of said ultraviolet lamps to reduce the rate of temperature rise of said filament from an initial value insufficient to cause ionization of the gas within said ultraviolet lamp, said soft start circuit including a negative temperature coefficient resistor for limiting the current applied to said filament.

* * * * *